US011612969B1

(12) United States Patent
Arsenault, Jr. et al.

(10) Patent No.: US 11,612,969 B1
(45) Date of Patent: Mar. 28, 2023

(54) PIPE WELDING STABILIZER

(71) Applicants: John Arsenault, Jr., Gainesville, TX (US); Kenneth Locke, Gainesville, TX (US)

(72) Inventors: John Arsenault, Jr., Gainesville, TX (US); Kenneth Locke, Gainesville, TX (US)

( * ) Notice: Subject to any disclaimer, the term of this patent is extended or adjusted under 35 U.S.C. 154(b) by 9 days.

(21) Appl. No.: 17/537,713

(22) Filed: Nov. 30, 2021

(51) Int. Cl.
*B23K 37/053* (2006.01)
*B25B 7/04* (2006.01)
*B23K 101/06* (2006.01)

(52) U.S. Cl.
CPC ............ *B23K 37/0533* (2013.01); *B25B 7/04* (2013.01); *B23K 2101/06* (2018.08)

(58) Field of Classification Search
CPC .. B23K 37/0533; B23K 2101/06; B25B 7/04; B25B 7/18; B25B 5/147; B25B 23/0007

USPC ................... 269/9, 37, 43, 45, 900
See application file for complete search history.

(56) References Cited

U.S. PATENT DOCUMENTS 2,836,139 A * 5/1958 Holmberg .............. B23K 3/087
269/45
7,004,682 B1 2/2006 Moody
7,226,047 B1 6/2007 Beauchamp

* cited by examiner

*Primary Examiner* — Lee D Wilson
*Assistant Examiner* — Abbie E Quann
(74) *Attorney, Agent, or Firm* — Sanchelima & Associates, P.A.; Christian Sanchelima; Jesus Sanchelima

(57) ABSTRACT

A pipe welding stabilizer comprising a vise grip assembly, an adjustment assembly, and a pipe assembly. The vise grip assembly includes two vise grips mounted to either side of an adjustment assembly. The two vise grips include jaws with ridges that can be attached to a pipe surface. The vise grips help hold the pipe in place while it is being soldered to ensure it does not slip or fall before it is welded. The adjustment assembly includes pins that can be pushed in to adjust the width and reach of the grip of the two vise grips.

10 Claims, 4 Drawing Sheets

PIPE WELDING STABILIZER

I. BACKGROUND OF THE INVENTION

1. Field of the Invention

The present invention relates to pipe welding stabilizer and, more particularly, to a pipe welding stabilizer that includes a pair of vise grips that can be attached to a pipe work surface.

2. Description of the Related Art

Several designs for a pipe welding stabilizer have been designed in the past. None of them, however, include a plurality of vise grips that is adjustable for different pipe sizes and pipe alignments.

Applicant believes that a related reference corresponds to U.S. Pat. No. 7,004,682 issued for an articulated pipe jack clamp including a pair of laterally opposed L-shaped legs hinged at an upper end to a central threaded collar. Applicant believes that another related reference corresponds to U.S. Pat. No. 7,226,047 issued for a welder's pipe clamp including a pair of reciprocal handle members, each having a pivotal jaw attached thereto. None of these references, however, teach of a pair of vise grips that can be attached to a pipe work surface that includes a variety of pipe sizes and pipe alignments.

Other documents describing the closest subject matter provide for a number of more or less complicated features that fail to solve the problem in an efficient and economical way. None of these patents suggest the novel features of the present invention.

II. SUMMARY OF THE INVENTION

It is one of the objects of the present invention to provide a pipe welding stabilizer including a dual grip pipe holder to make it easier to solder together two sections of pipe.

It is another object of this invention to provide a pipe welding stabilizer that includes jaws that prevent slipping from a pipe work surface.

It is still another object of the present invention to provide a pipe welding stabilizer that includes an adjustable portion to secure both dual grip pipe holders to each other and the pipe work surface.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

III. BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents an operational view of a user utilizing a torch set 64 while the vise grip assembly 20 is mounted to a pipe assembly 60.

FIG. 2 shows an isometric view of the vise grip assembly 20 and adjustment assembly 40 mounted to the pipe assembly 60.

IV. DETAILED DESCRIPTION OF THE EMBODIMENTS OF THE INVENTION

Figure 1:
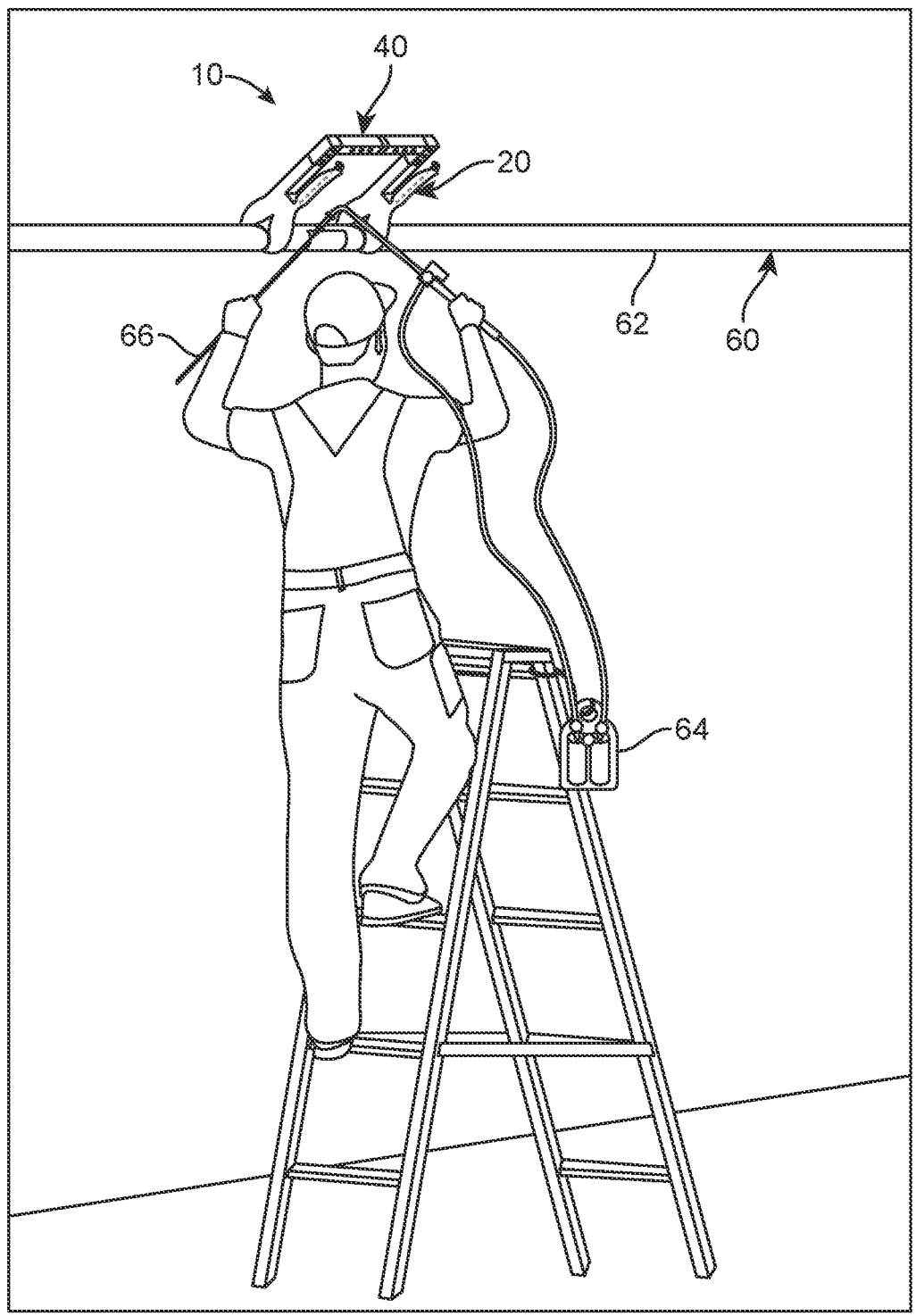

Referring now to the drawings, where the present invention is generally referred to with numeral 10, it can be observed that it basically includes a vise grip assembly 20, an adjustment assembly 40, and a pipe assembly 60.

Figure 2:
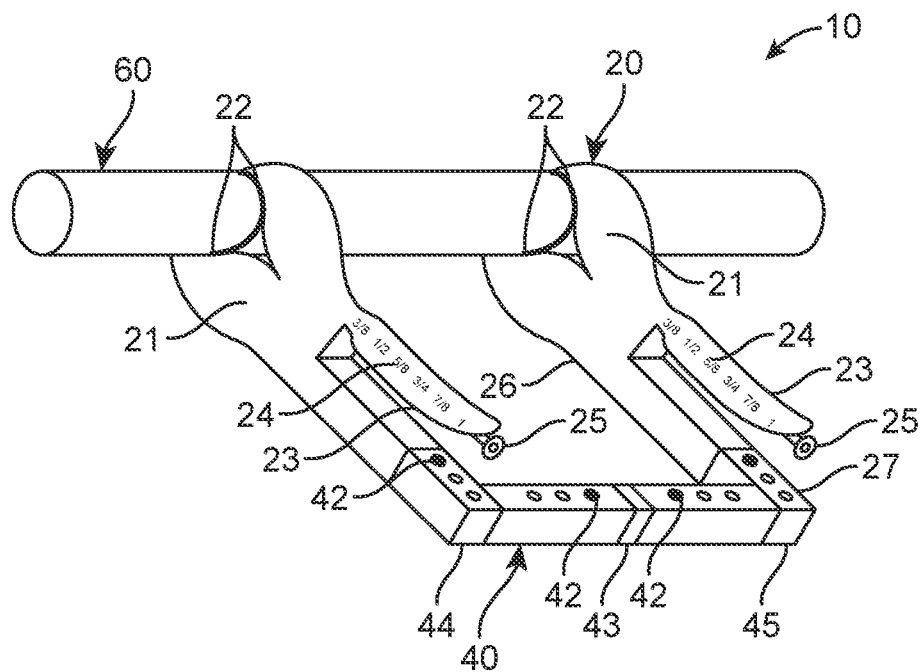

Best illustrated in FIG. 2 the vise grip assembly 20 may include a vise grip 21. The vise grip 21 may include jaws 22. Wherein said jaws 22 may include ridges to prevent slipping from the surface of a pipe 62 of pipe assembly 60. Located at a top portion of the vise grip 21 may be a handle 23. The handle 23 may allow for the user to open and close the jaws 22 around the pipe 62. The handle 23 may include indicia 24 located along a handle length. The indicia 24 may correspond to a variety of pipe widths. At a distal end of the handle 23 may be a jaw adjustment 25. The jaw adjustment 25 may include a threaded member that is rotably mounted within the handle 23. It may be suitable for the handle 23 to be longitudinally aligned to the handle 23. The rotation of the jaw adjustment 25 may extend and retract the threaded member with respect to the handle 23. The position of the threaded member of the jaw adjustment 25 with respect to the indicia 24 may communicate to the user the width of the pipe 62 the jaws 22 are set to grasp onto when said jaws 22 are in a closed position.

It may be preferable for the bottom of vise grip 21 to include an attachment portion 26. The attachment portion 26 may extend from a bottom portion of the jaws 22 to a grip adjustment 27. It may be suitable for the attachment portion 26 to be parallel to the handle 23. The attachment portion 26 may be a squared tubing made out of a rigid material. The grip adjustment 27 may be located at an attachment portion 26 distal end. The grip adjustment 27 may be an extension of the attachment portion 26. In one embodiment the grip adjustment 27 may include a plurality of circular apertures longitudinally spanning an interior portion. Preferably, the vise grip assembly 20 may include an identical pair of vise grip 21 mounted to opposite ends of the adjustment assembly 40.

Figure 3:
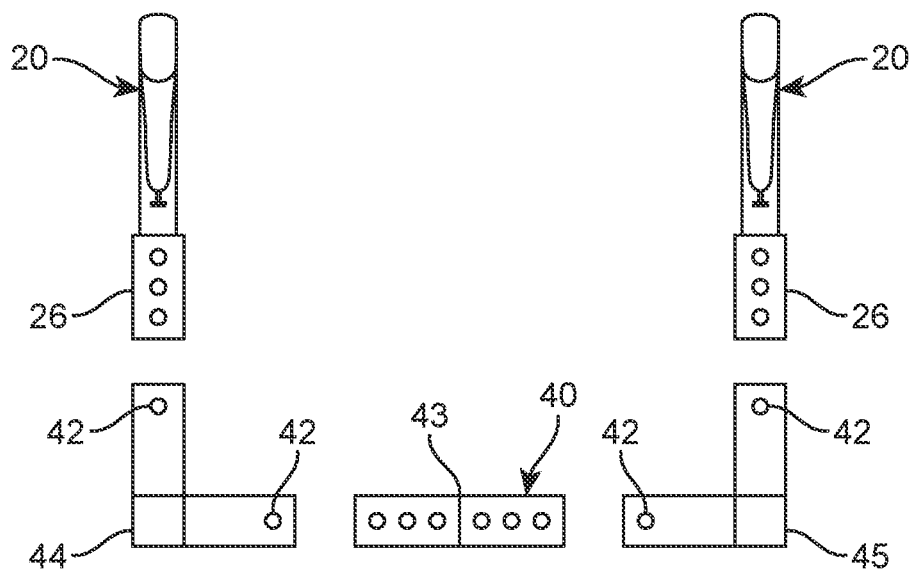
FIG. 3 illustrates an exploded top view of vise grip assembly 20 and adjustment assembly 40.
Figure 4:
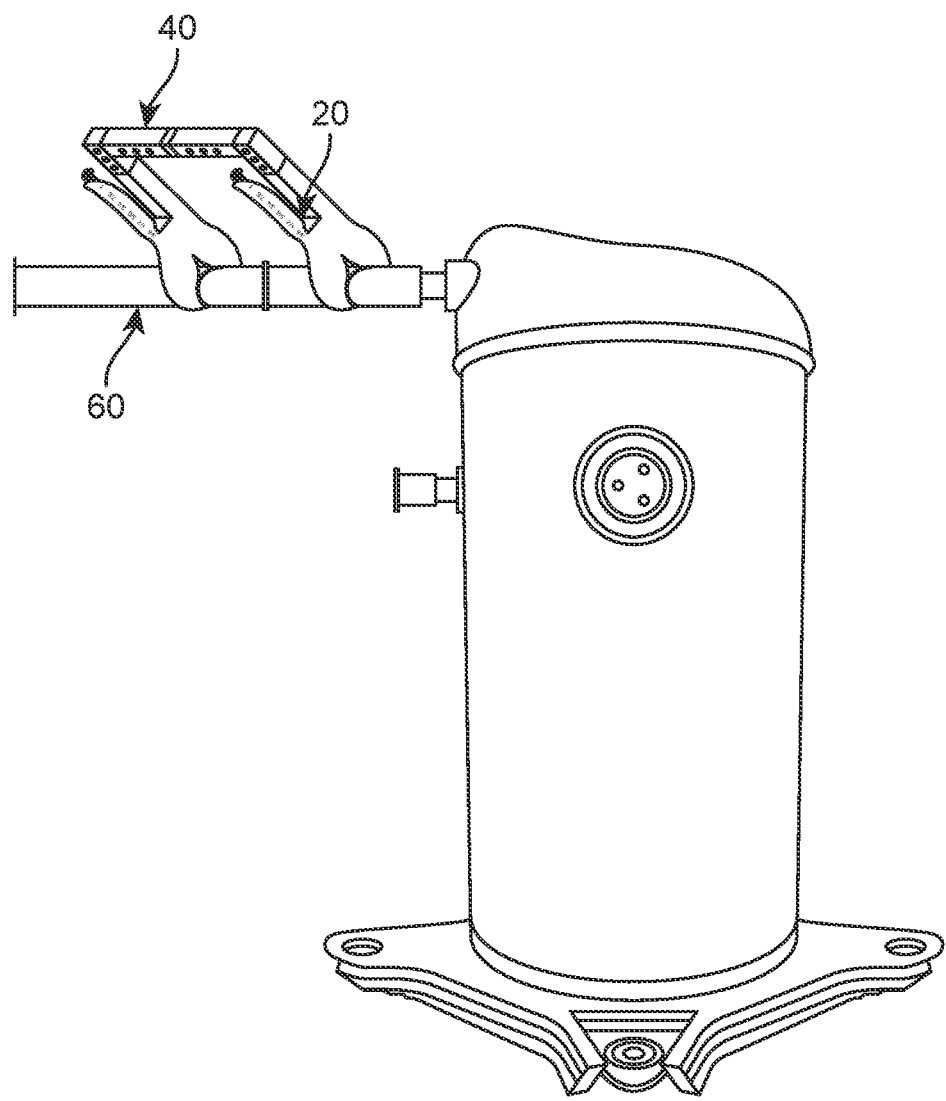
FIG. 4 is a representation of the vise grip assembly 20 mounted to a pipe work surface extending from a compressor.
Figure 5:
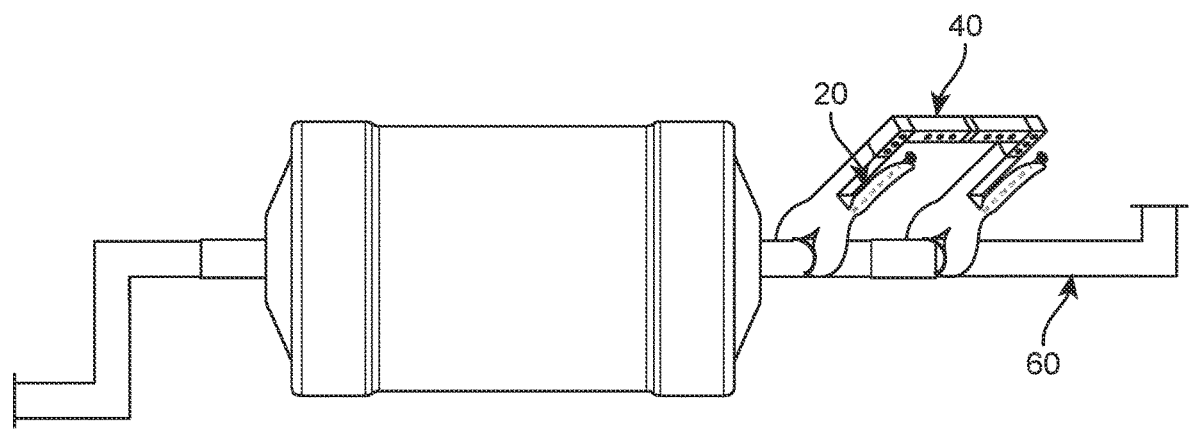
FIG. 5 depicts the vise grip assembly 20 mounted to a pipe work surface in close proximity and extending from a liquid line filter drier.

Shown in FIG. 3 the adjustment assembly 40 may include a first joint member 44 and a second joint member 45. The first joint member 44 and the second joint member 44 may be opposing pairs to be received at a top end within the grip adjustment 27. In one embodiment the first joint member 44 and the second joint member 44 may be L-shaped members. Each of which may include a pin 42 at distal ends of the L-shaped members. The pin 42 may allow for the attachment portion 26 to be secured thereon. The pin 42 in conjunction with the attachment portion 26 of the pair of vise grip 21 may help a user clamp on to two sections of pipe 62 that may be out of alignment. Further included in the adjustment assembly 40 may be a width adjustment 43. In one iteration the width adjustment 43 may be a squared tubing including a series of longitudinal apertures. It may be suitable for the width adjustment 43 to receive the first joint member 44 and the second joint member 44 at opposing distal ends. The first joint member 44 and the second joint member 44 may be secured to their respective vise grip 21 pair and to the width adjustment 43 via the pin 42. The pin 42 may be pushed toward the interior of the L-shaped members to engage and disengage with the apertures located on the grip adjustment 27 and the width adjustment 43.

In an ideal operating environment, a user may attach the jaws 22 of the pair of vise grip 21 to two sections of pipe 62. The jaws 22 may be adjusted to fit around a variety of pipe 62 widths by rotating the jaw adjustment 25. The width or distance between the pair of vise grip 21 may be adjusted via the width adjustment 43. To help grasp two sections of pipe 62 that are misaligned a user may utilize the pin 42 to secure the grip adjustment 27 in different positions. Once the vise grip assembly 20 and the adjustment assembly 40 is secured to a user's desired position the two sections of pipe 62 are ready to be welded or soldered together. As the welding of pipes often require tools such as a torch set 64 and a brazing rod 66, a user's hands is unable to hold the tools and the pipes at the same time. The present invention 10 allows for a much safer and more precise welding of two sections of pipe 62.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for a pipe welding stabilizer, comprising:
a) a vise grip assembly including at least two vise grips, wherein the at least two vise grips form a dual grip pipe holder that is configured to clamp onto two sections of pipe, the at least two vise grips each including a handle, an attachment portion, and a grip adjustment, wherein each said grip adjustment is an extension of each of the attachment portions; and b) an adjustment assembly including a width adjustment, a first joint member, and a second joint member, the first joint member and the second joint member each having first and second ends with at least one pin in each of said first and second ends, wherein each of the at least one pins on said first ends are received by opposing ends of the width adjustment, wherein each of the at least one pins on said second ends are received by each of the the grip adjustments of the vise grip assembly, wherein a first one of the at least two vise grips is mounted to the first joint member, wherein a second one of the at least two vise grips is mounted to the second joint member.

2. A system for a pipe welding stabilizer of claim 1 wherein each of said at least two vise grips has jaws to prevent the two sections of pipe from slipping out of place or shifting.

3. A system for a pipe welding stabilizer of claim 1 wherein said each of the at least two vise grips includes a jaw adjustment.

4. A system for a pipe welding stabilizer of claim 3 wherein each of the jaw adjustments is a threaded member with a knob portion mounted within each of the handles to facilitate the expansion and contraction of the jaws of each of the at least two vise grips to fit around a variety of pipe widths.

5. A system for a pipe welding stabilizer of claim 1 wherein each of said handles includes indicia corresponding to a variety of pipe widths.

6. A system for a pipe welding stabilizer of claim 1 wherein each said grip adjustment and width adjustment each have a squared tube shape with a plurality of longitudinal apertures to receive the at least one pins of the first ends of each of the grip adjustments.

7. A system for a pipe welding stabilizer of claim 1 wherein said first joint member is an L-shaped member.

8. A system for a pipe welding stabilizer of claim 1 wherein said second joint member is an L-shaped member.

9. A system for a pipe welding stabilizer, comprising: a) a vise grip assembly including at least two vise grips, wherein the at least two vise grips form a dual grip pipe holder that is configured to clamp onto two sections of pipe, the at least two vise grips each including a handle, an attachment portion, and a grip adjustment, wherein each said grip adjustment is an extension of the attachment portion, each of the at least two vise grips has jaws to prevent the two sections of pipe from slipping out of place or shifting, wherein said each of the at least two vise grips includes a jaw adjustment; and b) an adjustment assembly including a width adjustment, a first joint member, and a second joint member, the first joint member and the second joint member each having first and second ends each comprising at least one pin in each of said first and second ends, wherein each the at least one pins of the first ends is received by opposing ends of the width wherein each of the at least one pins on said second ends are received by each of the grip adjustments of the vise grip assembly, each said grip adjustment and width adjustment each have a squared tube shape with a plurality of longitudinal apertures to receive the at least one pins of the first ends of each of the grip adjustments, wherein a first one of the at least two vise grips is mounted to the first joint member, wherein a second one of the at least two vise grips is mounted to the second joint member.

10. A system for a pipe welding stabilizer, consisting of: a) a vise grip assembly including at least two vise grips, wherein the at least two vise grips form a dual grip pipe holder that is configured to clamp onto two sections of pipe, the at least two vise grips each including a handle, an attachment portion, and a grip adjustment, wherein each said grip adjustment is an extension of each of the attachment portions, each of the at least two vise grips has jaws to prevent the two sections of pipe from slipping out of place or shifting, wherein said each of the at least two vise grips includes a jaw adjustment, each of the jaw adjustments being a threaded member with a knob portion mounted within the handle to facilitate the expansion and contraction of each of the jaws to fit around a variety of pipe widths, each said handle including indicia corresponding to said variety of pipe widths; and b) an adjustment assembly including a width adjustment, a first joint member, and a second joint member, the first joint member and the second joint member each having first and second ends each comprising at least one pin in each of said first and second ends, wherein each of the at least one pins of the first ends is received by opposing ends of the width adjustment, wherein each of the at least one pins on said second ends are received by each of the grip adjustments of the vise grip assembly, each said grip adjustment and width adjustment each have a squared tube shape with a plurality of longitudinal apertures to receive the at least one pins of the first ends of each of the grip adjustments, wherein a first one of the at least two vise grips is mounted to the first joint member, wherein a second one of the at least two vise grips is mounted to the second joint member, the first joint member and the second joint member each having an L-shape.

* * * * *